United States Patent [19]

Pollack et al.

[11] Patent Number: 4,782,494

[45] Date of Patent: Nov. 1, 1988

[54] METHOD OF PROVIDING CONTINUOUS LASING OPERATION

[75] Inventors: Slava A. Pollack, Palos Verdes Estates; David B. Chang, Tustin, both of Calif.

[73] Assignee: Hughes Aircraft Company, Los Angeles, Calif.

[21] Appl. No.: 868,929

[22] Filed: May 30, 1986

[51] Int. Cl.$^4$ .............................................. H01S 3/09
[52] U.S. Cl. ...................................... 372/91; 372/69; 372/39
[58] Field of Search ........................ 372/39, 69, 18, 66, 372/72, 97, 91

[56] References Cited

U.S. PATENT DOCUMENTS 4,589,118  5/1986  Suzuki et al. ..................... 372/69

OTHER PUBLICATIONS

Batygov et al., "Erbium-Doped CaF$_2$ Crystal Laser Operating at Room Temperature", Sov. Jour. Quant. Elec., vol. 4, No. 12, Jun. 1975.

Gomelauri et al., "Single-Mode Q-Switched CaF$_2$:Er$^{3+}$ Laser", Sov. Jour. Quant. Electr., vol. 6, No. 3, p. 341, Mar. 1976.

Primary Examiner—Leon Scott, Jr.
Attorney, Agent, or Firm—John Holtrichter, Jr.; A. W. Karambelas

[57] ABSTRACT

The method of producing at least quasi-continuous lasing operation between initial and terminal lasing states comprising the steps of selecting a laser medium and cavity configuration (lasing frequency) with the laser medium containing upconverting material which provides for the exchange of energy between sufficient number of electrons at the terminal lasing state (manifold) so as to maintain population inversion between the initial and terminal lasing states during the lasing operation; and applying excitation energy of a suitable amount to the laser medium during at least a quasi-continuous time period.

9 Claims, 12 Drawing Sheets

METHOD OF PROVIDING CONTINUOUS LASING OPERATION

CROSS REFERENCE TO A RELATED APPLICATION

U.S. application, Ser. No. 869,270, entitled "UP-CONVERSION PUMPED LASERS", filed concurrently with the subject application by the same inventors.

BACKGROUND OF THE INVENTION

This invention relates generally to the laser art and more particularly to solid state, room temperature, continuous wave lasers and the method of operation thereof.

It is well known that some rare earth ions, when incorporated as impurities in sufficient concentration into a suitable host lattice, can upconvert infrared radiation to various shorter wavelengths. Upconversion, i.e., the conversion of long-wave into short-wave radiation by certain solids, without assistance of auxiliary radiation, can be accomplished by several multiphoton mechanisms. However, only one, the cooperative excitation mechanism, is thought to be efficient enough to be practical. The latter mechanism proceeds according to a scheme in which the groundstate electrons of several atoms (ions) absorb one infrared photon each. The energy subsequently migrates through a nonradiative process to a single atom exciting it to a higher energy level with ensuing fluorescence.

Approximately 15 transition group ions, primarily rare-earths, incorporated in various solid-state host materials are known to lase in a continuous wave (CW) mode but a majority of these lines require low temperature for lasing. Room temperature CW operation is important for many scientific, medical and industrial applications. For example, CW lasers are used for spectroscopic studies, for surgical and coagulating purposes, for cutting and drilling materials, for communication in conjunction with integrated optics and alignment of electro-optical hardware.

$Er^{3+}$ ions have been lased in solid state, room temperature lasers but in a pulsed mode only. Lasing of $Er^{3+}$ ions between $^4I_{11/2}$ and $^4I_{13/2}$ states (See FIGS. 2 and 11) around 3 μm in a pulsed mode has been produced in the past in more than a dozen different host materials. In many hosts, $Er^{3+}$ lased without deactivating ion assistance.

Most 3 μm erbium lasers have the following properties in common: (1) they operate at room temperature; (2) they require high erbium ion concentration for low excitation energy; and (3) they are characterized by the terminal state/initial state lifetime ratio greater than one, in some materials this ratio exceeds ten. Surprisingly, these lasers operate quite well in a pulsed mode at room temperature with low pump energy threshold. The third property would seem to prohibit these lasers from lasing in a CW mode.

To explain pulsed lasing, a hypothesis was put forward by previous workers taking into account Stark splitting of the $^4I_{11/2}$ and $^4I_{13/2}$ excited states. According to the hypothesis, the $^4I_{11/2} \rightarrow ^4I_{13/2}$ lasing process proceeds as follows. Initially, the upper levels of the terminal state are sparcely populated. Therefore, population inversion is produced at the levels of $^4I_{11/2}$ manifold resulting in The shorter wavelength lines rapidly disappear from the laser spectrum because the lower lying levels of the terminal manifold saturate faster. Only the longest wavelength lines, terminating on the upper levels of the terminal manifold, would survive and be observed in the late laser spectrum. This is the so-called "red shift" of spectral lines of self-saturating lasers. Laser transitions between states, for which initial state lifetime is shorter than terminal state lifetime, are called self-saturating.

SUMMARY OF THE INVENTION

A part of the rationale of the subject invention relates to recognition of properties of the $^4I_{11/2} \rightarrow ^4I_{13/2}$ laser transition of $Er^{3+}$ ion (see FIGS. 2 and 11). For example, it was concluded that at least in a $CaF_2$ host the above hypothesis does not explain two important experimental facts. First, the predicted red shift is indeed observed in the laser spectrum; however, the long (red) wavelength emission lasts only a short time. Through some mechanism, the low lying levels of the terminal manifold (e.g., the $^4I_{13/2}$ state) are again emptied, restoring the short wavelength emission that dominates the "late" laser spectrum. Second, due to a surprisingly small amount of optical energy required to invert initial state populating, it was concluded that a $CaF_2$ ($Er^{3+}$) laser, for example could be operated in a quasi-continuous wave mode.

One aspect of the subject invention, comprises the method of producing quasi-continuous lasing operation between initial and terminal lasing states comprising the steps of selecting a laser medium and resonator configuration (lasing frequency) with the laser medium containing upconverting material which provides for the exchange of energy between sufficient number of electrons at the terminal lasing state (manifold) so as to maintain population inversion between the initial and terminal lasing states during the lasing operation; and applying excitation energy of a suitable amount to the laser medium during at least a quasi-continuous time period. In accordance with one embodiment of the invention the upconverting material is such a material that some of the exchanging electrons are upconverted to energy states at or above the meta-stable initial lasing state. In a more specific embodiment, the laser medium comprises a calcium fluoride crystal hosting 5 to 10 mole percent of erbium ions and the cavity is tuned for lasing between states $^4I_{11/2}$ and $^4I_{13/2}$ at approximately 2.8 μm, see FIG. 11. It is noted relative to FIG. 11 that although distinct states, e.g., $^4I_{11/2}$ and $^4I_{13/2}$ between which lasing at 2.8 μm, for example, takes place are illustrated, it will be understood by those skilled in the art that more accurately the lasing occurs between a band of energy states around, e.g., the $^4I_{11/2}$ state (the initial manifold) and that the emitted lasing energy encompasses a band of wavelengths around 2.8 μm. Also, although FIG. 11 shows applied energy at 1.54 μm, it will be understood that initial population inversion between the lasing states may occur due to energy applied over a wide frequency range, for example, direct pumping to a number of energy states above the $^4I_{13/2}$ state. In accordance with one aspect of the invention, CW operation is made possible by the recycling of electrons away from the lower lasing manifold so that population inversion is maintained. This recycling involves, for the example of two ion interacting, one of the exchanging ions dropping below the manifold level (e.g., from $^4I_{13/2}$ to $^4I_{15/2}$) and the other exchanging ion being elevated to or above (e.g., the $^4I_{9/2}$ energy state) the initial lasing manifold which is, e.g., the $^4I_{13/2}$ energy state. Upconversion refers to the elevation of the energy state of the electrons rather than a comparison of the frequencies of applied and emitted energies. A Quasi-continuous time period is an extended period, for example over 20 ms, wnich is not limited by loss of population inversion due to the life time of the terminal state for example, the period may be established by the duration of the excitation energy. Hereinafter such quasi-continuous time periods will also be referred to as continuous time periods.

It is, therefore, an object of the invention to provide a new solid state, room temperature, continuous wave laser and method for operation thereof.

Another obiect is to provide a CW infrared erbium laser and method for operation thereof.

A further object is to provide a method of producing quasi-continuous lasing operation at about 2.8 μm.

BRIEF DESCRIPTION OF THE DRAWINGS

The novel features that are considered characteristic of this invention are set forth with particularity in the appended claims. The invention itself, both as to the organization and method of operation as well as additional objects and advantages thereof, will best be understood from the following description when read in connection with the accompanying drawings in which life reference numerals refer to like parts and in which:

DESCRIPTION OF THE PREFERRED EMBODIMENTS

Erbium contained as an impurity in many host lattices can upconvert 1.5 μm and 980 nm radiation with or without assistance of a sensitizer. Some pure erbium compounds, e.g., $ErF_3$, also exhibit this property. The radiation is absorbed or transferred to the $^4I_{13/2}$ and/or $^4I_{11/2}$ states of the $Er^{3+}$ ion and is converted to several visible and infrared bands. Alkaline earth-fluoride crystals doped with a few mole percent of erbium are characterized by a very efficient upconversion.

Figure 1:
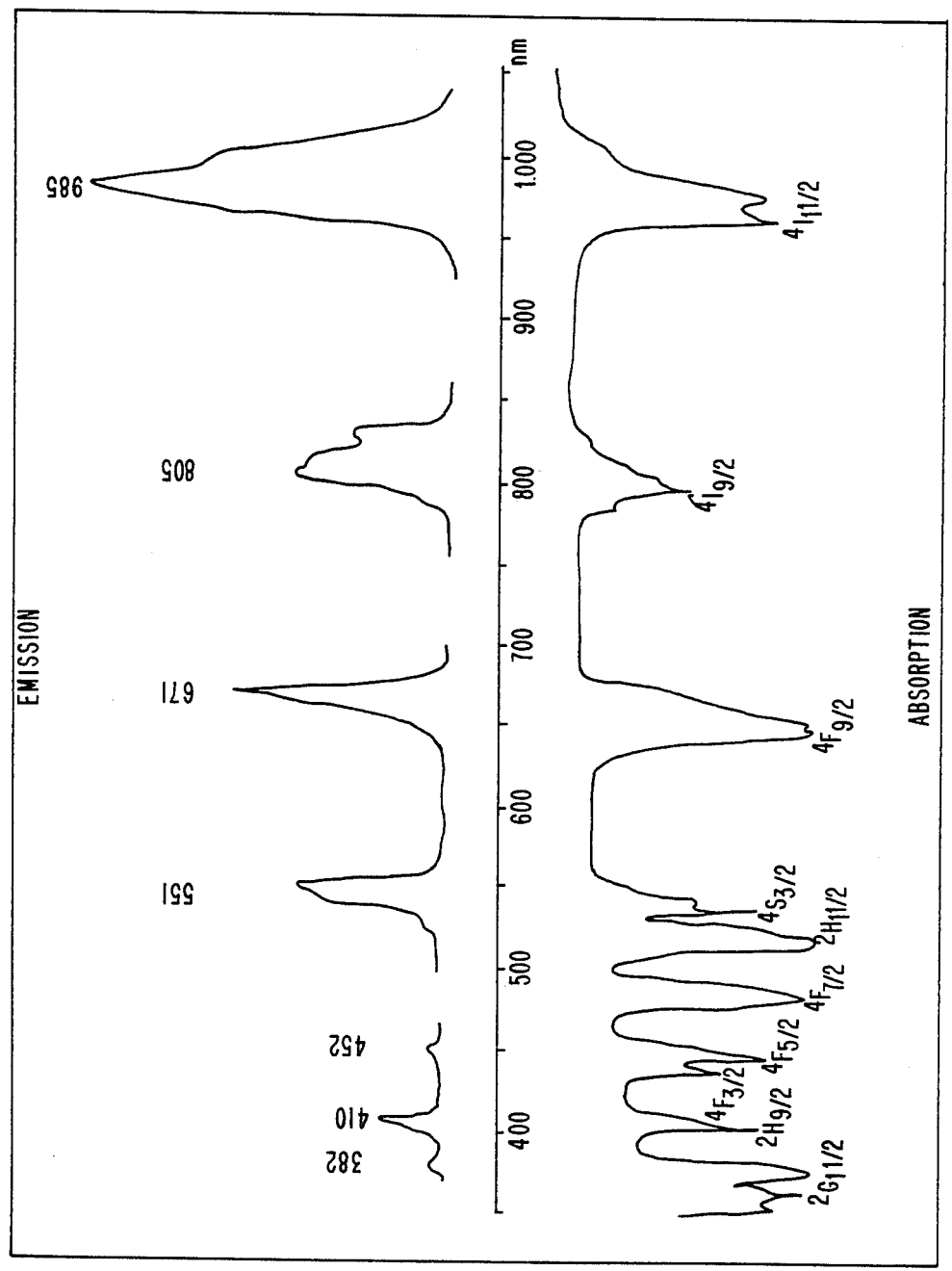
FIG. 1 depicts the absorption and emission bands of $CaF_2$ (10% $Er^{3+}$). Emission is excited by upconverted 1.5 μm radiation. Relative intensities of emission bands are not drawn to scale.
Figure 2:
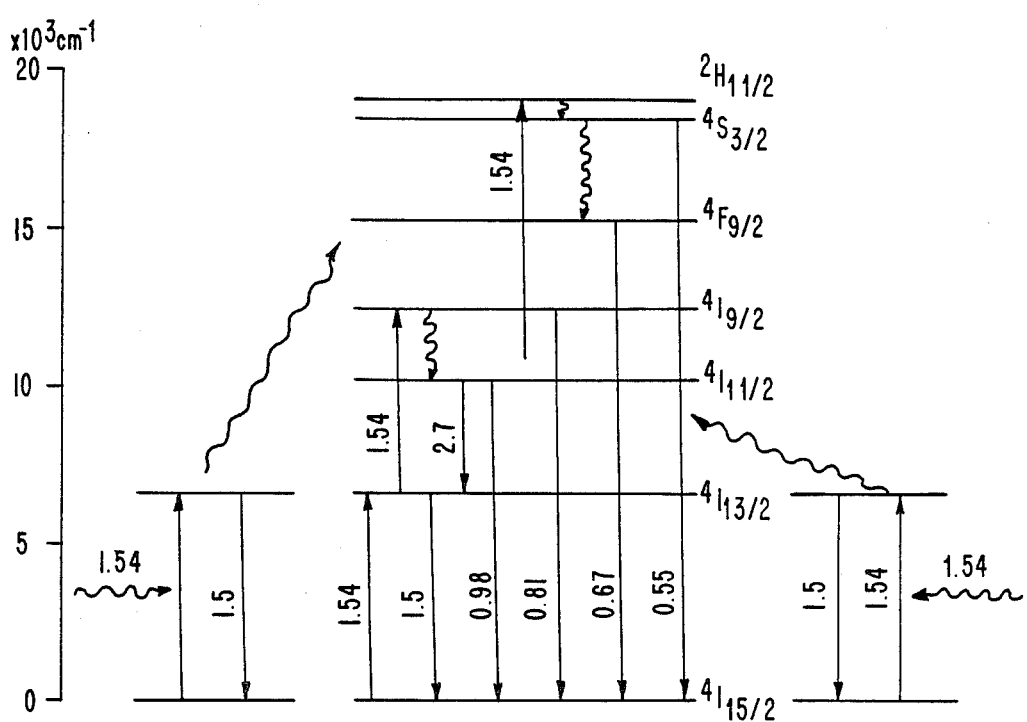
FIG. 2 depicts the energy level diagram of $Er^{3+}$ ion and upconversion excitation scheme.

Adsorption of 1.5 μm radiation in $CaF_2$ (10% $Er^{3+}$) results in emission of seven bands in the red to violet region of the spectrum ranging in wavelengths from 985 to 382 nm, as shown in FIG. 1 with the emission and absorption bands juxtaposed. FIG. 2 shows the energy level diagram of the $Er^{3+}$ ion and an excitation scheme for the principal upconverted bands. In addition to the bands shown in FIG. 1, three bands in the infrared, around 2.7, 2.0, and 1.15 μm, have also been observed. These bands arise from the transitions between the $Er^{3+}$ excited states, viz. $^4I_{11/2} \rightarrow ^4I_{13/2}$, $^4I_{9/2} \rightarrow ^4I_{11/2}$ and $^4F_{9/2} \rightarrow ^4I_{13/2}$, respectively.

The relative band intensities, excluding the weak 2.0 and 1.15 μm bands, corrected for the detector and monochromator sensitivities and normalized to the intensity of the resonant 1.65 μm band, are given in Table I. It can be seen that the strongest upconverted emission occurs from the $^4I_{11/2}$ state.

Without a $Yb^{3+}$ sensitizer, upconversion of 980 nm in $CaF_2$ ($Er^{3+}$) is weak. Only two emission bands at 671 and 551 nm are detectable; however, their intensities are two orders of magnitude weaker than the intensities of their counterparts excited by upconversion of 1.5 μm radiation.

Figure 3:
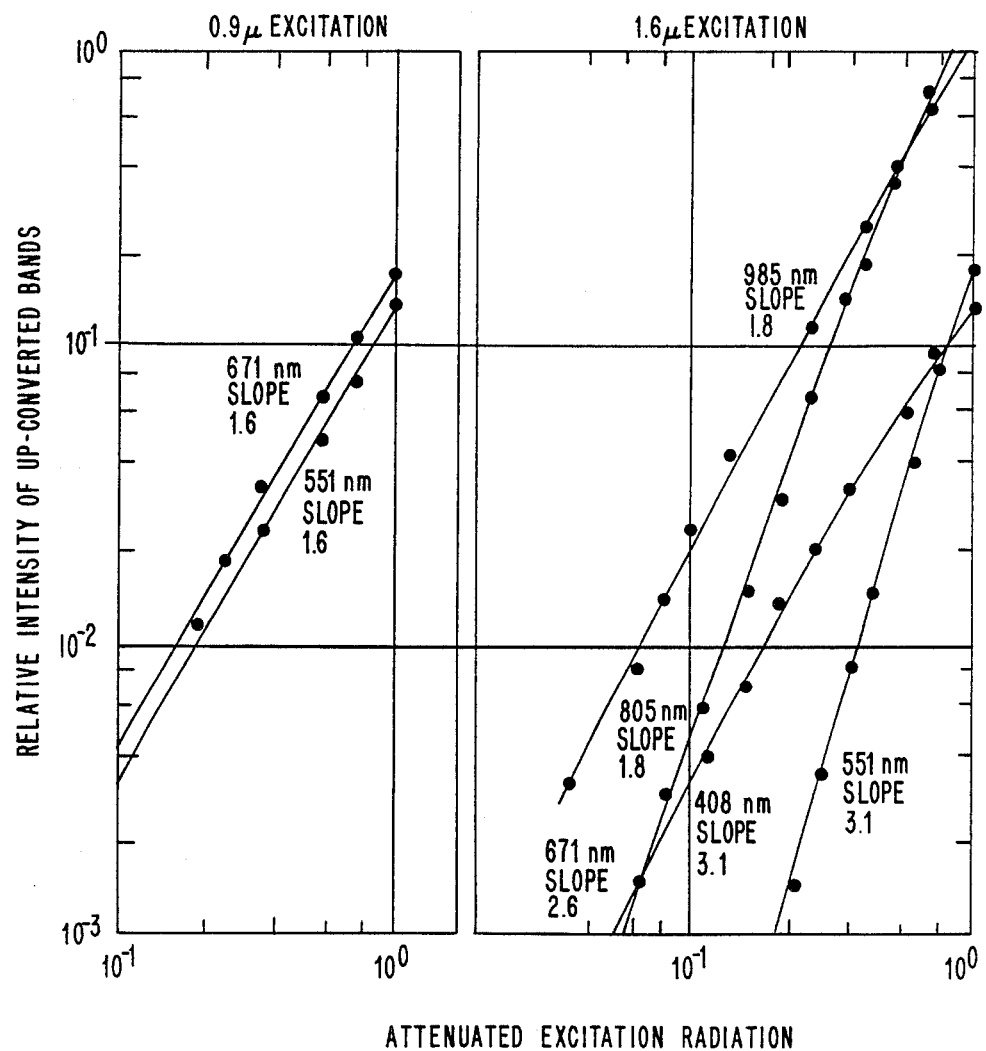
FIG. 3 depicts the relative intensities of major upconverted bands versus relative intensities of 1.6 μm and 0.9 μm excitation radiation.

The excitation schemes shown in FIG. 2 are derived from the results of relative intensity measurements of upconverted bands versus attenuated excitation radiation, shown in FIG. 3. It follows from the slopes of the plotted curves that the intensities of the 671 and 551 nm bands have a cubic dependence, and the intensities of the 985 and 805 nm bands, a quadratic dependence on the intensity of 1.5 μm excitation radiation. In other words, the first and the last two bands are the results of three and two photon upconversion processes, respectively.

TABLE I

| λ, nm | Initial State | Relative Intensity |
|---|---|---|
| 2,700 | $^4I_{11/2}$ | 0.22 |
| 1,615 | $^4I_{13/2}$ | 1 |
| 985 | $^4I_{11/2}$ | 0.58 |
| 828 | $^4I_{9/2}$ | $2.8 \times 10^{-2}$ |
| 670 | $^4F_{9/2}$ | 0.17 |
| 550 | $^4S_{3/2}$ | $9.3 \times 10^{-2}$ |
| 452 | $^4F_{5/2}$ | $1.8 \times 10^{-4}$ |
| 410 | $^2H_{9/2}$ | $1.7 \times 10^{-3}$ |
| 382 | $^2G_{11/2}$ | $1.2 \times 10^{-5}$ |

Figure 4:
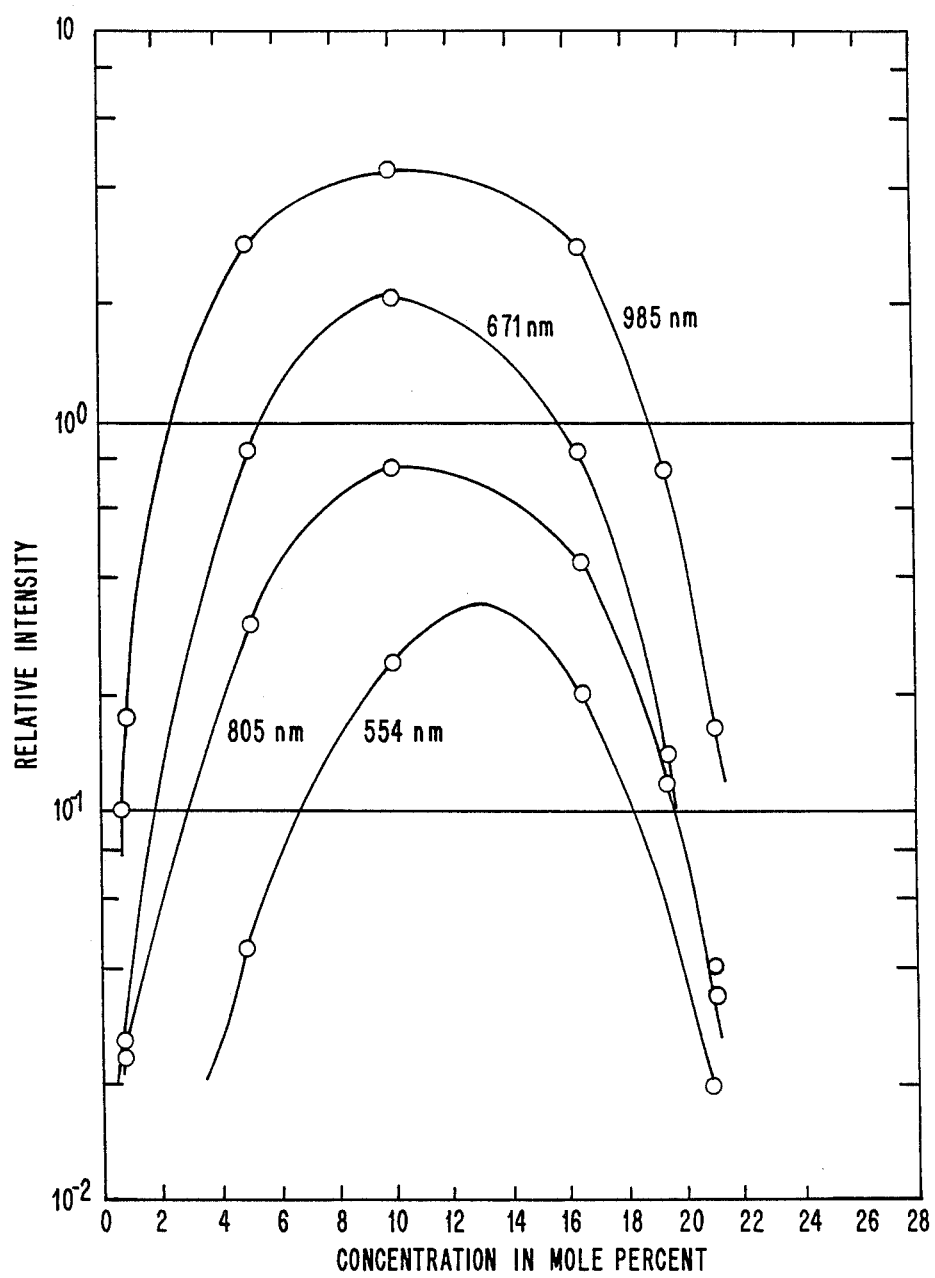
FIG. 4 depicts the dependence of relative intensities of upconverted bands on concentration of $Er^{3+}$ ions in $CaF_2$.
Figure 5:
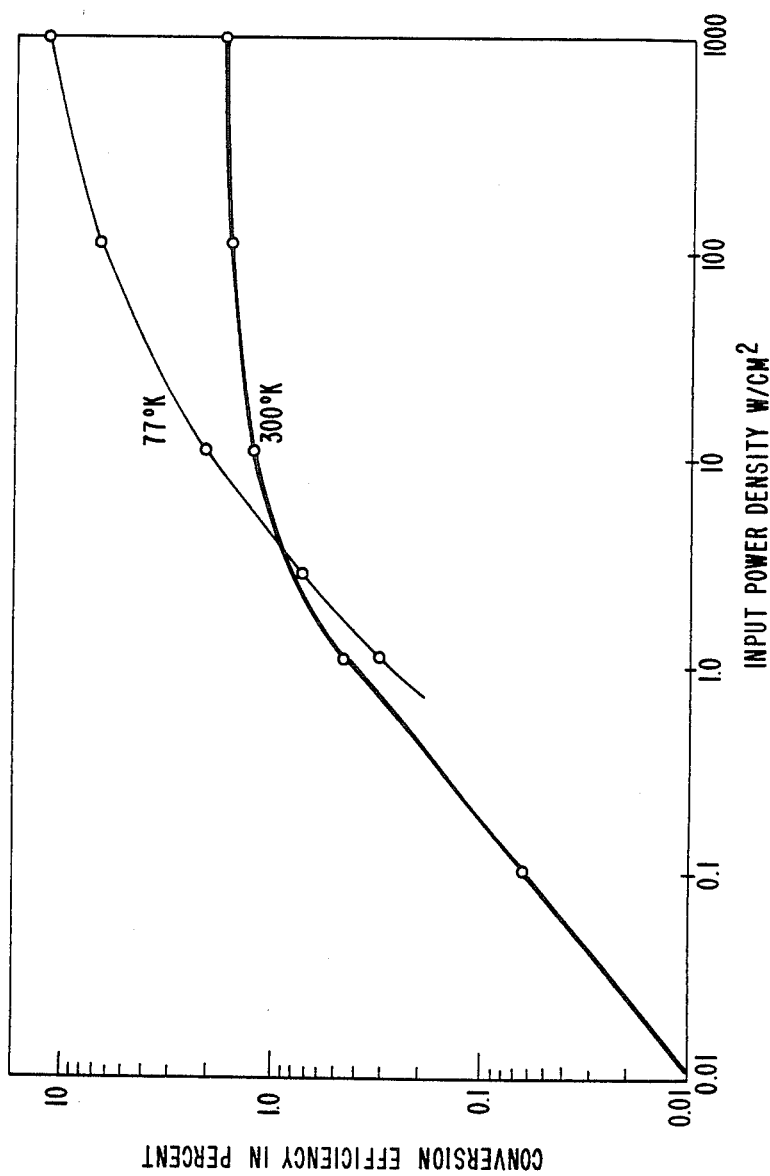
FIG. 5 depicts the upconversion efficiency for visible bands versus intensity of 1.5 μm excitation radiation.

FIG. 4 shows the dependence of the relative intensity of upconverted bands on the concentration of $Er^{3+}$ ions in CaF$_2$, and FIG. 5 shows the conversion efficiency of the visible bands as a function of input power density. It follows from FIG. 4 that the strongest upconversion occurs when the concentration of Er$^{3+}$ ion is around 10 mole percent.

Figure 6:
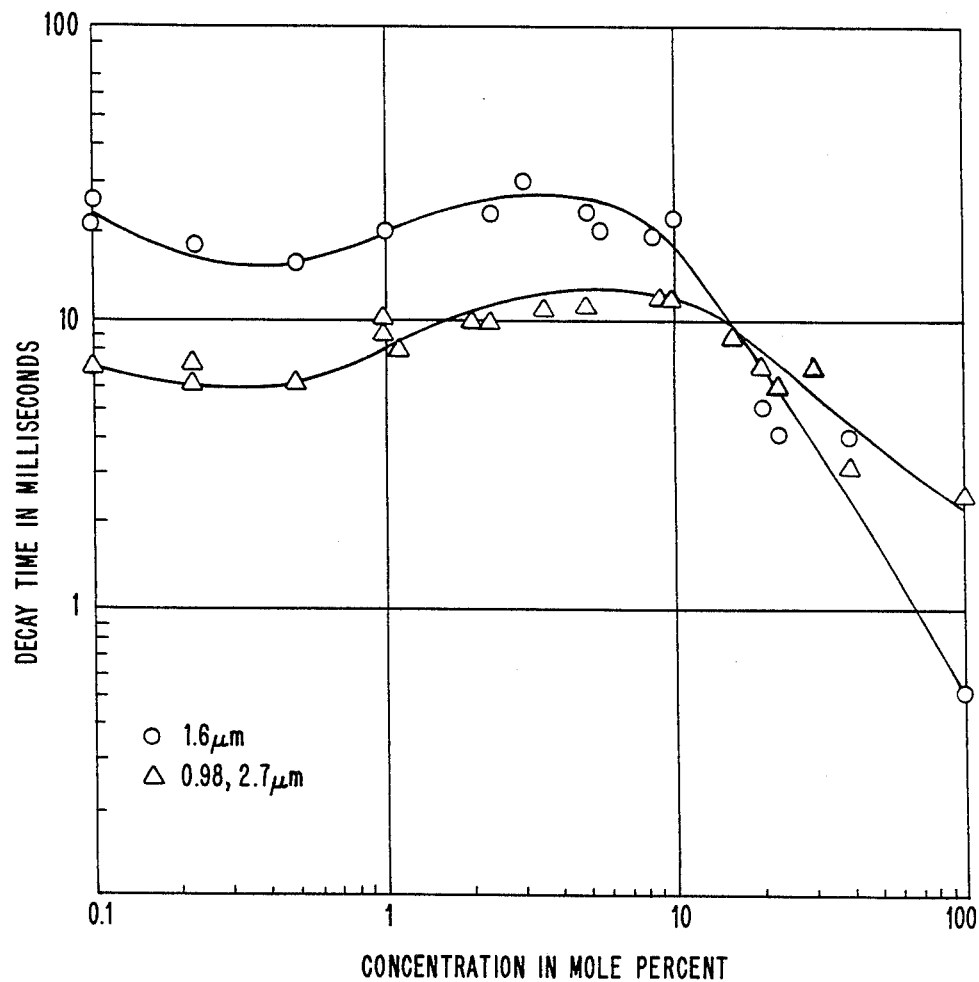
FIG. 6 depicts the lifetimes of $^4I_{11/2}$ and $^4I_{13/2}$ at room temperature versus concentration of $Er^{3+}$ ions in $CaF_2$.

In order to select the proper concentration of Er$^{3+}$ ion in CaF$_2$, various important parameters associated with this transition were measured as a function of concentration. FIG. 6 shows the measured lifetimes of the initial $^4I_{11/2}$ and $^4I_{13/2}$ states as the function of concentration at room temperature.

The measurements were performed by exciting the samples with the filtered short-wave radiation of short duration (20 $\mu$sec) xenon flash lamp pulses. It should be remarked at this juncture that, generally, the decay curves of fluorescence bands produced by conventional flash lamp excitation technique are different from the decay curves of the same emisson bands excited by upconverted IR short duration pulses. In the former case, the decay curve time constants represent the lifetimes of the excited states from which fluorescence originates; in the latter case, the time constants are related to the lifetime of an intermediate state, such as $^4I_{13/2}$.

It can be seen from FIG. 6 that the lifetime of the upper state $\tau_2$ is shorter than the lifetime of the lower state $\tau_1$ up to Er$^{3+}$ ion concentrations of around 20 mole percent. Laser transitions between states for which the inequality $\tau_2 < \tau_1$ holds were hereto generally thought to be self-saturating. The main difficulty encountered in exciting the self-saturating lasers lies in producing sufficient population inversion between the operating levels. The use of 20 mole percent concentration of Er$^{3+}$ in CaF$_2$ was presented because the excessive concentration affects the laser rod's optical quality and thus its ability to lase.

The $^4I_{11/2} \rightarrow {^4I_{13/2}}$ was reported some time ago in CaF$_2$ doped with Er$^{3+}$ and Tm$^{3+}$ ions; "Thermal Switching of Laser Emission of Er$^{3+}$ at 2.69$\mu$ and Tm$^{3+}$ at 1.86$\mu$ in Mixed Crystals of CaF$_2$: ErF$_3$: TmF$_3$"; M. Robinsson, D. P. Devor, Appl. Phys, Lett., Vol. 10, No. 5, pg. 167, 1967. The addition of Tm$^{3+}$ ions was intended to shorten the lifetime of the $^4I_{13/2}$ state through nonradiative energy transfer from Er$^{3+}$ to Tm$^{3+}$ ions. Such a transfer has previously been reported by Johnson, et al; "Energy Transfer From Er$^{3+}$ to Tm$^{3+}$ and Ho$^3$ Ions in Crystals", Phys. Rev., Vol. 133, Number 2A, pg. A494, 1964. Lasing was produced at room temperature with the reported threshold of only 10 Joules.

Since then, this laser emission of Er$^{3+}$ between the $^4I_{11/2}$ and $^4I_{13/2}$ states, occurring around 3 $\mu$m, has been produced in more than a dozen different host materials; A. A. Kaminskii, Laser Crystals, Springer Series in Optical Sciences, Editor D. L. MacAdam, Vol. 14, Springer-Verlag, Berlin, Heidelberg, New York, 1981. In many hosts, including CaF$_2$, the Er$^{3+}$ ion lases without deactivating ion assistance.

Most 3 $\mu$m erbium lasers have the following properties in common: (1) they operate at room temperature, (2) they require high erbium ion concentration for low pump energy, and (3) they are characterized by a terminal state/initial state lifetime ratio greater than one; in some host materials this ratio exceeds ten. Surprisingly, these laser operate quite well in a pulsed mode at room temperature with low pump energy. To explain pulsed lasing, a hypothesis was put forward taking into account Stark splitting of the $^4I_{11/2}$ and $^4I_{13/2}$ excited states; A. A. Kaminskii, Laser Crystals, Springer Series in Optical Sciences, Editor D. L. MacAdam, Vol. 14, Springer-Verlag, Berlin, Heidelberg, 1981. They are split into six and seven Kramers' doublet components, respectively, in crystalline fields of low symmetry. According to this hypothesis, the $^4I_{11/2} \rightarrow {^4I_{13/2}}$ lasing process proceeds as follows. The short optical pumping pulse of an xenon flash lamp preferentially populates (with or without the aid of a sensitizer) the upper $^4I_{11/2}$ state, leaving the levels of the terminal $^4I_{13/2}$ state manifold empty or sparsely populated. The population inversion produced at the levels of the $^4I_{11/2}$ manifold results in self-saturated laser transitions to various levels of the terminal state manifold. The shorter wavelength laser lines rapidly disappear from the spectrum because the lower lying levels of the terminal manifold saturate faster. Only the longest wavelength lines, arising from transitions which terminate on the upper levels of the terminal manifold, persist longer and can be observed in the late laser spectrum. This is the so-called "red shift" of the spectral lines of self-saturating lasers.

Figure 7:
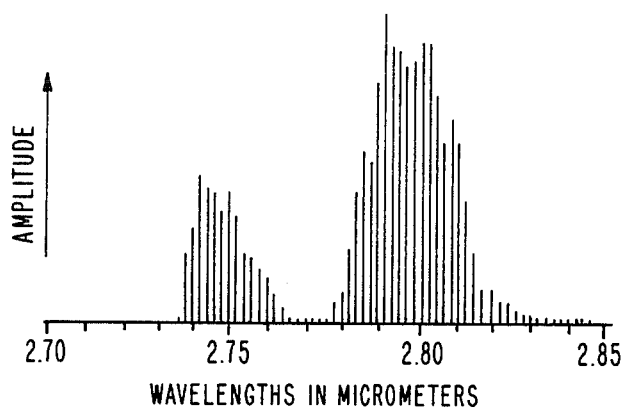
FIG. 7 depicts the spectral output of $^4I_{11/2}$ $^4I_{13/2}$ laser transition in $CaF_2$ ($Er^{3+}$) in a vacuum at room temperature.
Figure 8:
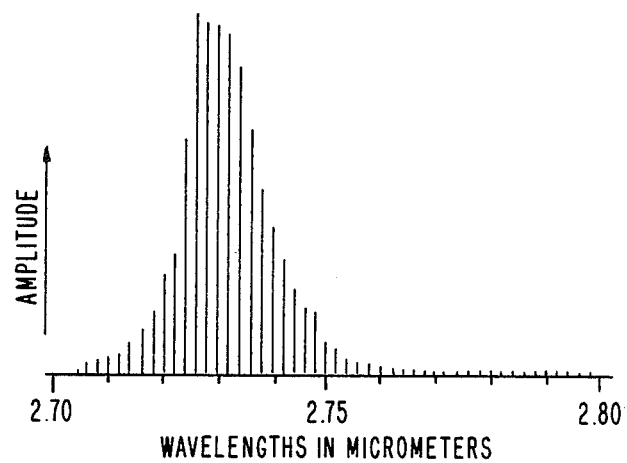
FIG. 8 depicts the spectral output of $^4I_{11/2}$ $^4I_{13/2}$ laser transition in $CaF_2$ ($Er^{3+}$) in 100 mm Hg of $CO_2$ at room temperature.

The $^4I_{11/2} \rightarrow {^4I_{13/2}}$ laser transition of Er$^{3+}$ in CaF$_2$ occurring in 2.7-2.8 $\mu$m spectral region coincides with the strong absorption regions of CO$_2$ and H$_2$O molecules; therefore, presence of these molecules in the laser cavity affects the position and number of the observed bands in the laser spectrum. To illustrate this effect, FIG. 7 shows the low resolution spectrum produced in a vacuum, and FIG. 8 shows the spectrum obtained when the laser cavity was filled with 10 mm Hg of CO$_2$. Since a pulsed laser was used, the spectra were recorded point-by-point by advancing the monochromator dial 5 nm at a time, which was the monochromator's resolution limit.

At medium-to-high constant laser excitation levels, the output spectrum, i.e., the shape of the recorded bands, remained fairly constant and reproducible from one recording run to the next; whereas, at the low excitation levels, a considerable amount of "line hopping" was observed, within as well as outside the recorded bands, resulting in changed spectral output and band shapes from pulse-to-pulse. This observation indicates the existence of a finer structure in these bands.

Figure 9:
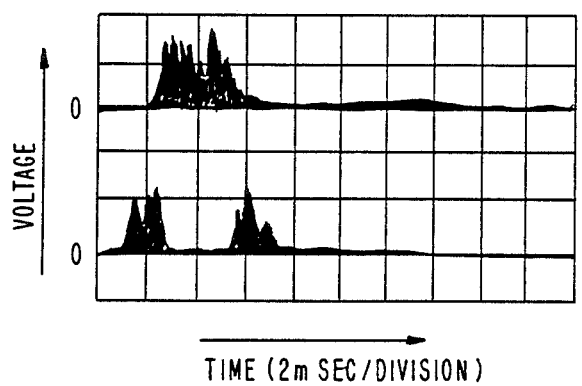
FIG. 9 depicts the time resolved $CaF_2$ ($Er^{3+}$) laser emission at 2.75 μm (lower trace) and 2.80 μm (upper trace).

It follows from FIG. 7 that in a vacuum, emission occurs in two bands centered around 2.75 $\mu$m and 2.80 $\mu$m. Resolution limitation did not allow the recording of the fine details of these bands; however, they provided the opportunity to verify the existence of the above postulated red shift. For this purpose, the laser beam was split with the aid of a beam splitter in two components. Each component was fed into a monochromator equippped with an InAs detector. One monochromator was set at 2.75 $\mu$m, while the other one was set at 2.80 $\mu$m. The predicted red shift was indeed observed in the laser spectrum, as shown in FIG. 9; however, the long wavelength emission did not persist to the end. Through some mechanism, the lower levels of the terminal manifold were again emptied, restoring the short wavelength emission that dominated the late laser spectrum.

Figure 10:
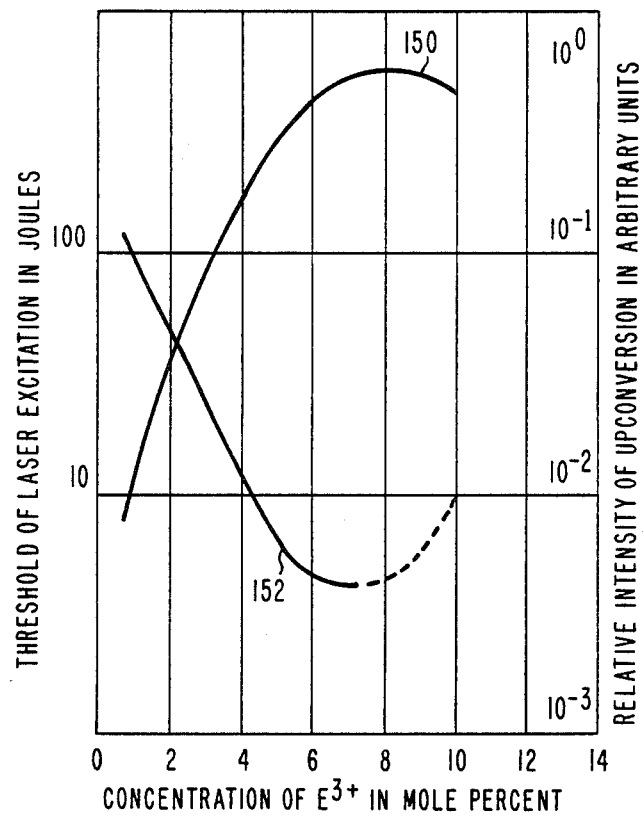
FIG. 10 depicts threshold pumping energy (bottom curve 152) and intensity of upconverted radiation (top curve 150) as functions of $Er^{3+}$ ion concentration in $CaF_2$.

It is hypothesized that this mechanism was energy state upconversion. This hypothesis was bolstered by another obseration. When the relative intensity of upconverted radiation in samples of CaF$_2$(Er$^{3+}$) is plotted versus concentration, and threshold energy of laser made from the same samples versus concentration the two curves which are juxtaposed in FIG. 10 were obtained. It can be seen that both represent a similar but inverted functional dependence on $Er^{3+}$ ion concentration. Because of deteriorating laser rod optical quality with increasing concentration, comparison could not be extended beyond 5-10 mole percent concentration.

Figure 11:
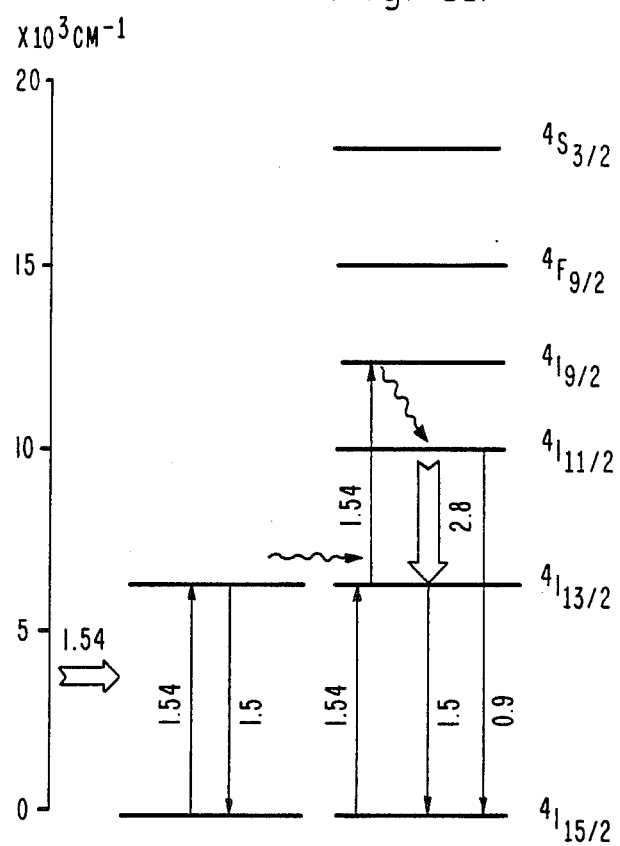
FIG. 11 depicts the energy levels involved in upconversion and laser pumping scheme for $^4I_{11/2} \rightarrow ^4I_{13/2}$ transition in $CaF_2$ ($Er^{3+}$).

Several experimental measurements and observations have implicated upconversion as an important factor in the optical pumping process. Firstly, measurements of lasing between $^4I_{11/2}$ and $^4I_{13/2}$ states in $CaF_2$ ($Er^{3+}$), see FIGS. 2 and 11, showed that, even though the lifetime of the $^4I_{11/2}$ upper state is only half (10 msec) that of the $^4I_{13/2}$ lower state (20 msec), self-quenching of lasing does not occur. Secondly, contrary to normal self-quenching laser behavior, the long-wave lines disappear from the laser spectrum during a laser pulse prior to disappearance of the shortwave lines. Thirdly, persistence of lasing action excited by a short duration (1 msec) xenon flash lamp can exceed the lifetime of the $^4I_{11/2}$ lasing state almost by a factor of two. In addition, it was observed that laser threshold pump energy and upconversion excited fluorescence intensity have the opposite dependence on concentration of the $Er^{3+}$ ion.

A simple theoretical model has been developed which showed that a laser operating between the $^4I_{11/2}$ and $^4I_{13/2}$ levels can be pumped solely by upconversion of ions in the excited $^4I_{13/2}$ state produced by absorption of 1.5 $\mu$m radiation. Experimental confirmation of this prediction: lasing action at 2.8 $\mu$m in $CaF_2$ ($Er^{3+}$) was produced by upconversion pumping along using 1.54 $\mu$m laser radiation emitted by an erbium in glass laser. FIG. 4 shows 2.8 $\mu$m lasing (upper trace) produced by pumping with 1.54 $\mu$m erbium laser radiation (lower traces) at 800 Joules energy input.

The theory also showed that: (1) a minimum 1.54 $\mu$m pump energy is required; (2) lasing will occur with a delay inversely proportional to the pump energy; and (3) lasing can persist for as long as the lifetime of the lower $^4I_{13/2}$ state, i.e., 20 msec. All these predictions have been experimentally verified.

It is important to emphasize the upconversion participates in the population inversion process even when a $CaF_2$ ($Er^{3+}$) laser is conventionally pumped by a xenon flash lamp through radiation absorption into the energy states laying above the lasing state. The following described two-pulse experiment demonstrates the role of upconversion as an optical pump mechanism. Two flash lamps that could be flashed independently with a controlled delay time were incorporated into the laser cavity. The energy in each flash lamps' capacitor bank was adjusted to equal values below the threshold so that, when fired individually, the flash lamps could not stimulate lasing emission. When the two lamps were fired simultaneously lasing occurred. Additionally, lasing occurred when the second flash lamp firing was progressively delayed and then stopped when the delay was longer than 25 msec. Since the lifetime of the $^4I_{11/2}$ initial state is about 10 msec, pump energy summing could not have occurred at this state when the second flash delay exceeded 10 msec; summing could only have occurred at the $^4I_{13/2}$ terminal state. Therefore, when the second pulse was delayed for more than 10 msec and less than 20 to 25 msec (lifetime of the $^4I_{13/2}$ state) the pumping occurred via upconversion.

The remaining problem was to identify the source of upconverted 1.5 $\mu$m radiation and to determine whether the radiation was supplied externally (i.e., directly by the xenon flash lamp), or generated internally through relaxation, i.e., by various electronic transitions from the higher energy states to the $^4I_{13/2}$ state. After inspections of a typical xenon flash lamp emission spectrum, it because obvious that it has very little emission at 1.5 $\mu$m and, therefore, the xenon flash lamp could not provide an adequate photon flux for upconversion. To verify this conclusion, we determined the laser pump energy threshold value using xenon flash lamp in air and compared it with the value obtained when the laser cavity was filled with water; water is a very efficient 1.5 $\mu$m radiation absorber. The measured threshold value in water was about 25 percent lower than that in air, thus confirming the above conjecture that the source of 1.5 $\mu$m radiation for upconversion was internal. The lowering of threshold energy value in water was attributed to a better optical coupling resulting from a better refractive index matching between the lamp and the laser rod.

Lasing action at 2.8 $\mu$m was produced using laser rods made of pure $CaF_2$ doped with $Er^{3+}$ ions in different concentrations and containing neither sensitizing nor deactivating ions. The pump energy threshold values varied from about 50 to 20 Joules for 1 and 10 mole percent $Er^{3+}$ ion concentration, respectively. Due to better optical quality of the laser rods, the lowest threshold values were obtained for the rods containing 5 mole percent; depending on the reflectivity of the outcoupling mirrors, they varied between 5 and 10 Joules. The lowest threshold value achieved using a high reflectivity mirror and vacuum in the laser cavity was 2.8 Joules. Since the xenon flash lamp pulse duration was about 1 msec, this value translates into 2.8KW peak threshold power.

Figure 13:
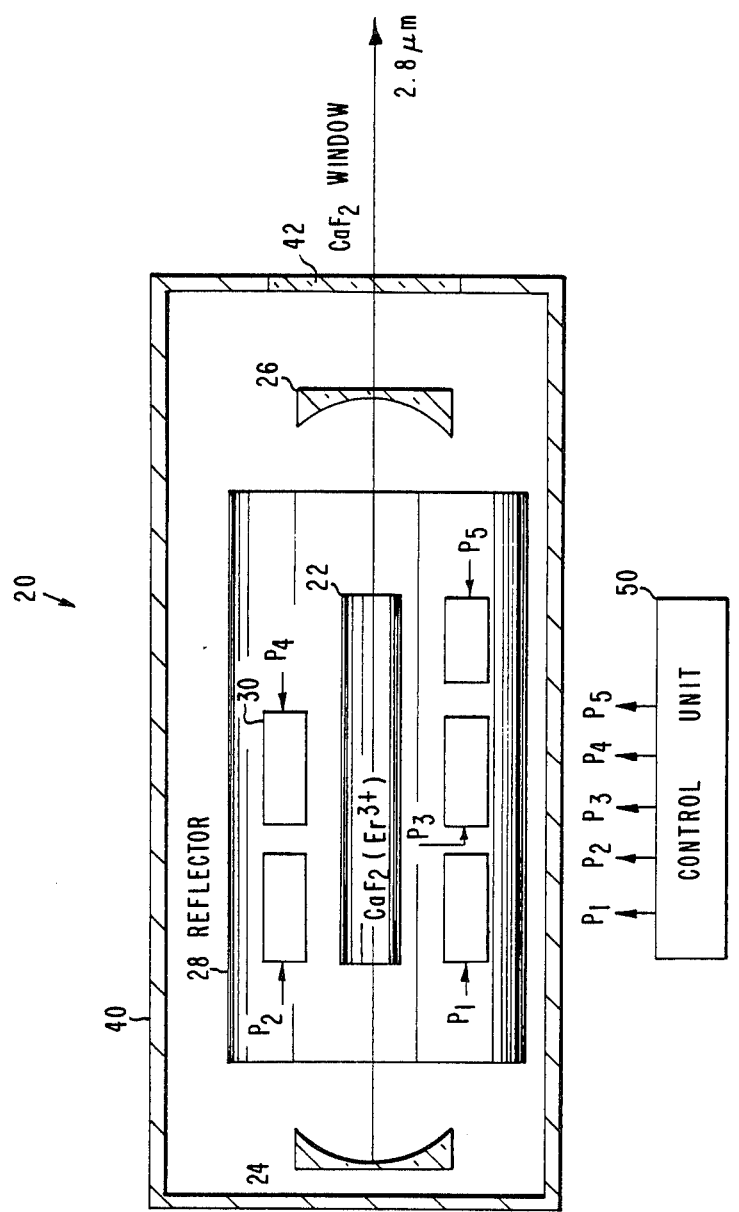
FIG. 13 is a schematic diagram of a $CaF_2$ upconversion laser arrangement suitable for operation in accordance with the invention.

The laser arrangement 20 of FIG. 13 uses a $CaF_2$ (5% $Er^{3+}$) rod 22.

Figure 12:
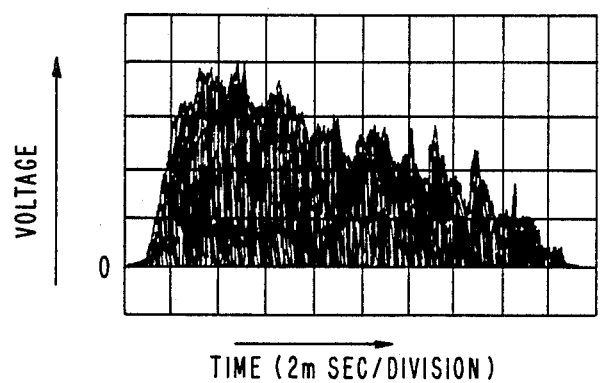
FIG. 12 depicts the laser emission at 2.8 μm in $CaF_2$ ($Er^{3+}$) excited by 1 msec xenon flash lamp pulse at room temperature.
Figure 14:
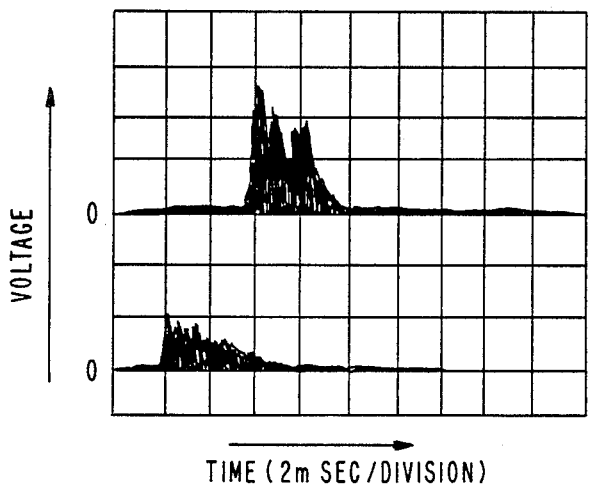
FIG. 14 depicts the emission of $CaF_2$ (5% $Er^{3+}$) laser around 2.8 μm (upper trace) excited by 1.54 μm radiation of erbium glass laser (lower trace) at room temperature.

The selected $CaF_2$ (5% $Er^{3+}$) laser rod 22 was tested in air at room temperature for energy output efficiency and other laser characteristics. A xenon flash lamp was used for excitation, in a cavity with ZnSe concave (1 m radius) dielectric mirrors with 90 and 99.5 percent reflectivity (in the test arrangement). The pump energy threshold was about 15 Joules. Output energies in excess of 0.5 Joule per pulse and peak power over 30 watts were achieved at input energies of 150–200 Joules into the flash lamp, with a slope efficiency in excess of 0.3 percent. The spiking laser pulse, 17 msec in duration, is shown in FIG. 12. The energy and power output values given above were not optimized by varying reflectivity of the outcoupling mirror. The unusually long lasing persistence, excited by the xenon flash lamp pulse lasting only 1 msec, suggests a possibility of the excitation energy being recycled through upconversion inside the laser rod. This result is in agreement with a theoretical analysis which sets the upper limit for the upconversion excited lasing persistence equal to the lifetime of the terminal state, i.e., to 20 msec.

Laser 20 (FIG. 13) includes $CaF_2$ ($Er^{3+}$) rod 22 and ZnSe concave end mirrors 24 and 26. Rod 22 was grown by Optovac, Inc., and has two ground and polished parallel plane ends without anti-reflection coating. Rod 22 is incorporated within gold plated elliptical reflectors 28 with five photograph type 3MB flash lamps 30 which have a flash duration of 15 to 20 msec. Mirrors 24 and 26 are 99.5% reflective to 2.8 $\mu$m energy. The foregoing elements of laser 20 are enclosed within a chamber 40 having a $CaF_2$ window 42.

Control unit 50 sequentially fires the flash lamps 30 with a delay of approximately 15 msec between firings. The resulting quasi-CW lasing action produced a 2.8 $\mu$m output which lasted approximately 80 msec.

Figure 15:
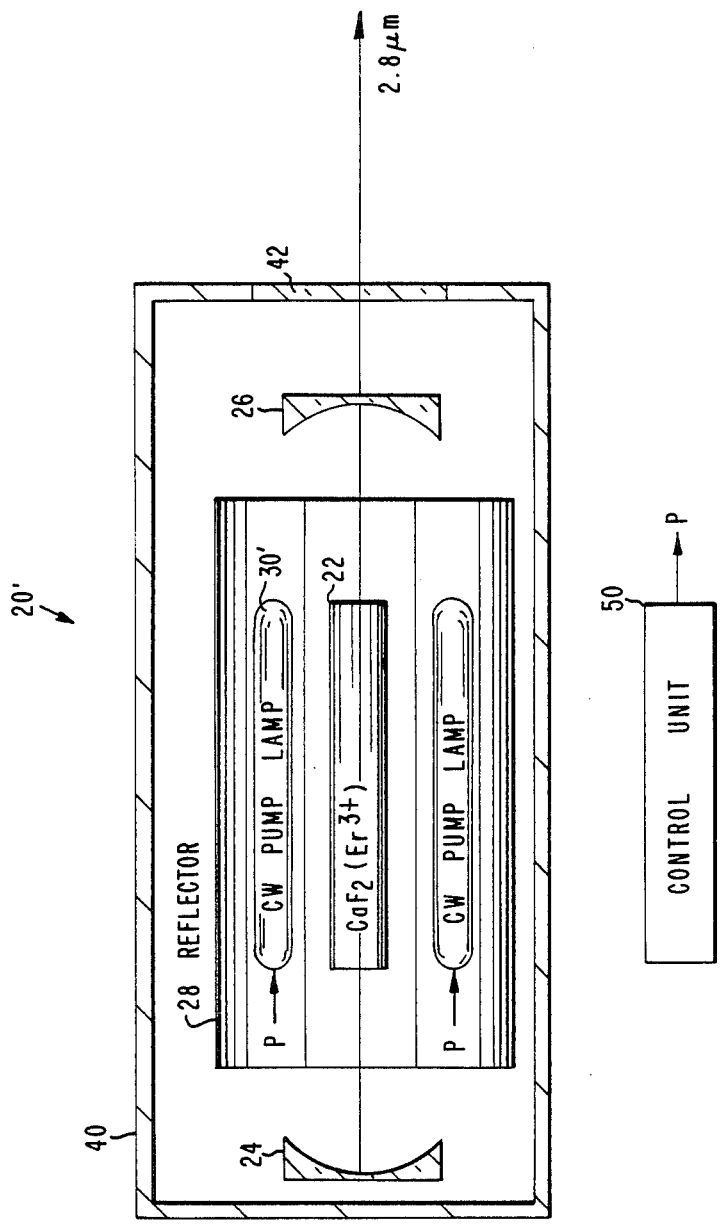
FIG. 15 is a schematic diagram of an arrangement of a $CaF_2$ ($Er^{3+}$) laser used to practice the method of the subject invention.

The embodiment of FIG. 15 is similar to that just described for FIG. 13 except that flash lamps 30 have been replaced with CW pump lamps 30', such as standard tungsten-iodine incandescent lamps which are continuously powered by control unit 50'. It is noted that prolonged operation may require liquid cooling (not shown) of the laser rod.

Hence, a new method of providing continuous lasing operation has been disclosed and more particularly a method which provides for continuous or of quasi-continuous operation of a solid state, room temperature laser. It will be appreciated that while the herein disclosure deals with particular methods of lasing operation that the invention is not limited thereto. Accordingly, any and all modifications, variations or equivalent arrangements which may occur to those skilled in the art are considered to be within the scope of the invention as defined in the following claims.

What is claimed is:

1. The method of producing continuous lasing operation between initial lasing states of $^4I_{11/2}$ and terminal lasing states of $^4I_{13/2}$ in a laser medium within a resonator comprising the steps of:

selecting a laser medium containing an upconverting material in a concentration sufficient to recycle electrons away from the terminal lasing states which provides for exchange of energy between sufficient number of electrons at the terminal lasing state so as to maintain population inversion between the initial and terminal lasing states durng lasing operation; and applying CW excitaton input energy to the laser medium during a time period of about 20 msec or greater to recycle electrons away from the lower lasing states through upconverting so that population inversion is maintained during a continuous time period and laser emission occurs in the range of 2.7 to 2.8 $\mu$m.

2. The method of claim 1 wherein said upconverting material is such a material that some of the exchanging electrons are upconverted to energy states at or above a meta-stable initial lasing state.

3. The method of claim 2 wherein the material is a rare earth material.

4. The method of claim 3 wherein said laser medium comprises calcium fluoride crystal.

5. The method of claim 1 wherein said upconverting material comprises erbium ions.

6. The method of claim 1 wherein said laser medium comprises a calcium fluoride crystal hosting erbium ions.

7. The method of claim 6 wherein said calcium fluoride crystal contains about 5 to 10 male percent of erbium ions.

8. The method of claim 1 wherein the material is a rare earth material.

9. The method of claim 8 wherein said laser medium comprises a calcium fluoride crystal hosting erbium ions.

* * * * *